United States Patent [19]
St-Hilaire et al.

[11] Patent Number: 5,943,321
[45] Date of Patent: Aug. 24, 1999

[54] CIRCUIT SET-UP AND CACHING FOR MULTIMEDIA MULTIPOINT SERVERS

[75] Inventors: Marc St-Hilaire, Ville Mont-Royal; Yonik Breton, Montreal; Pierre Brisson, Ste-Julie; Sylvain Labelle, Laval, all of Canada

[73] Assignee: General DataComm Inc., Middlebury, Conn.

[21] Appl. No.: 08/915,496

[22] Filed: Aug. 20, 1997

[51] Int. Cl.[6] .......................... H04L 12/16; H04Q 11/00; H04M 1/66; H04N 7/14

[52] U.S. Cl. .......................... 370/259; 370/260; 379/202; 348/15

[58] Field of Search .................................. 348/14, 15, 16; 370/259, 260, 261, 395, 522, 524, 263, 264, 410, 265, 397; 379/202, 203, 204

[56] References Cited

U.S. PATENT DOCUMENTS

| | | | |
|---|---|---|---|
| 5,555,017 | 9/1996 | Landante et al. | 348/15 |
| 5,625,407 | 4/1997 | Biggs et al. | 348/16 |

*Primary Examiner*—Chi H. Pham
*Assistant Examiner*—Afsar M. Qureshi
*Attorney, Agent, or Firm*—David P. Gordon; David S. Jacobson; Thomas A. Gallagher

[57] ABSTRACT

An MMS circuit set-up system includes a real time link manager (RTLM) which is coupled to the audio video controller (AVC) of the MMS. The AVC receives data from the MMS reservation system about the starting and ending times for conferences and sends commands to the RTLM to set up connections for the conference. The RTLM is provided with a database of configuration and location information about remote sites and has access to the resource database of one or more ATM switches and/or other networking equipment. The RTLM sends configuration messages to ATM switches and/or other networking equipment in order to set up a conference. According to a presently preferred embodiment, the ATM switches are controlled by the RTLM using SNMP (simple network management protocol) via an ETHERNET™ connection to the slot controllers of the ATM switches and networking equipment which does not support SNMP are controlled by the RTLM using TCP/IP (transaction control protocol/internet protocol) via an ETHERNET™ connection to the servers. The ATM circuits are preferably created by adding entries to an SPVC table in the ATM switch. According to one aspect of the invention, when ATM circuits are no longer needed, the SPVC table entries are not deleted, but the status for the circuit is marked "idle". This allows the circuit to be reused with minimal set-up time when it is again needed.

19 Claims, 5 Drawing Sheets

CIRCUIT SET-UP AND CACHING FOR MULTIMEDIA MULTIPOINT SERVERS

This application is related to co-owned, co-pending allowed Ser. No. 08/586,259, filed Jan. 16, 1996, for Multimedia Multipoint Telecommunications Reservation Systems, the complete disclosure of which is hereby incorporated by reference herein.

This application is also related to co-owned, co-pending Ser. No. 08/877,464, filed Jun. 16, 1997, (GDC-095) for Multimedia Multipoint Telecommunications Reservation Acceptance Systems and Controllers, the complete disclosure of which is hereby incorporated by reference herein.

BACKGROUND OF THE INVENTION

1. Field of the Invention

The invention relates to multimedia multipoint servers (MMS). More particularly, the invention relates to methods and apparatus for setting-up and re-establishing multimedia circuit connections between an MMS and remote sites through ATM, ISDN, or other types of networks.

2. State of the Art

Multimedia communication involves the exchange of audio, video, and data between two or more multimedia devices (typically PCs with attached video cameras) at different locations. When there are only two PCs involved, the connection between the PCs is relatively simple, provided that the two PCs use the same multimedia standard (for example H.320) and that a connection of sufficient bandwidth is available. However, when multiple PCs are involved, relatively complicated connections are often required. The complexity of the connection of multiple PCs is exacerbated by the fact that there are several different standards for multimedia communication, e.g. Motion JPEG, MPEG-2, H.320, etc. Each of these standards specifies a different encoding scheme and has its own bandwidth requirements. It is often desirable to interconnect several PCs, each of which is equipped for a different multimedia standard. In addition, these multimedia standards can be transported over data connections of different bandwidth capacities (e.g., ISDN, ATM, etc.). This also complicates the interconnection of multiple PCs for multimedia conferencing.

The issues involved in multimedia "multipoint" conferencing (multimedia conferencing among multiple PCs) have been addressed in the art and a partial solution has been provided through the use of a multipoint control unit (MCU). One such MCU is the General DataComm Multimedia Multipoint Server (MMS). The MMS is a switching device which includes support for the several different multimedia standards and the ability to convert from one standard to another. PCs may be directly connected to an MMS or may be connected to an MMS via a public or private telecommunications network. The MMS may be coupled to different types of telecommunications services such as an ISDN gateway server and an ATM switch. Typically, an MMS unit and its interconnection to remote PCs is managed by a network manager (a human being) who programs the MMS and arranges for the circuit connections to remote PCs. A multimedia conference must be reserved in advance by contacting the network manager who then determines whether the necessary MMS resources are available to conduct the conference at a particular time. Alternatively, a reservation system of the type described in previously incorporated co-owned applications may be used. If a reservation system is used, the network manager is relieved of the task of determining the availability of necessary resources and booking the conference. After a conference has been reserved, the telecommunications connections (e.g. ATM and ISDN connections) to remote PCs must be set-up by the network manager shortly before the conference begins or as permanent connections. The setting up of ISDN connections may be partially automated, but the setting up of ATM connections must be performed manually by the network manager. Due to the complexity of setting up these connections, they are typically set up once as permanent connections which wastes network bandwidth.

As mentioned above, the MMS may be connected to an ISDN gateway server, an ATM switch, or some other telecommunications equipment. The network manager associated with the MMS typically communicates with the server(s) and the switch(es) via a complex signalling protocol using software provided by different equipment vendors. While there are standard signalling protocols for ATM switches and ISDN servers, different switch and server manufacturers implement the protocols in different ways with their own proprietary software. The server(s) and the switch(es) respond to commands from the network manager to set up connections between the MMS and the remote PCs. When setting up the connections between the MMS and the remote PCs, the network manager must be cognizant of the bandwidth requirements for each remote PC and the multimedia standard in place at each of the remote PCs. Some standards require separate communications channels for audio and video, whereas other standards use a single channel for audio and video. In the case of ATM connections, the virtual circuit set-up from the MMS to a remote PC may involve several ATM switches and several connections. If a conference participant who is not connected to the MMS via a permanent connection leaves the conference and later wishes to return to the conference, a new connection will need to be established for that participant.

From the foregoing, it will be appreciated that as multimedia multipoint conferencing becomes more popular, it will require a more automatic operation than the state of the art systems provide. Although reservation systems have partially automated the operation of multimedia conferences, it would be desirable if the connection set-up could also be automated. However, the complex user network interfaces (UNIs) and signalling protocols used to set up connections make the automation of circuit set-up very difficult. Moreover, the common practice of providing "permanent" ATM connections wastes bandwidth and it would be preferable to provide ATM connections only as needed.

SUMMARY OF THE INVENTION

It is therefore an object of the invention to provide an automated circuit set-up system for automatically setting up circuits in a multimedia conference.

It is also an object of the invention to provide a circuit set-up system which may be accessed by any conference participant to set-up a circuit connection.

It is another object of the invention to provide a circuit set-up system which automatically determines and sets up the appropriate communication link(s) for each conference site.

It is still another object of the invention to provide a circuit set-up system which includes a circuit caching system for rapid re-establishment of circuits.

Yet another object of the invention is to provide a circuit set-up and caching system which can control a variety of ATM switches and ISDN servers.

Still another object of the invention is to provide a circuit set-up system which does not require the use of complex signalling protocols or proprietary software for different switches and servers.

It is another object of the invention to provide a circuit set-up and caching system which conserves bandwidth.

In accord with these objects which will be discussed in detail below, the circuit set-up system of the present invention includes a real time link manager (RTLM) which is coupled to one or more ATM switches, ISDN servers, or other networking equipment via an out-of-band connection. The RTLM is provided with access to one or more databases of configuration and location information about conference sites and the resources of one or more ATM switches and/or ISDN servers. According to the invention, the RTLM sends configuration messages to ATM switches and/or ISDN servers in order to set up the necessary connections for a conference. The RTLM communicates with the switches and servers via out-of-band (preferably over TCP/IP-transaction control protocol/internet protocol) communications rather than the complex in-band signalling protocols currently used. According to a presently preferred embodiment, the ATM switches are controlled by the RTLM using SNMP (simple network management protocol) via an ETHERNET™ connection to the slot controllers of the ATM switches and the ISDN servers are controlled by the RTLM using the protocols for the particular ISDN servers, sending commands over TCP/IP via an ETHERNET™ connection to the ISDN servers. The ATM circuits are preferably created by adding entries to an SPVC (semi-permanent virtual circuit) table in the ATM switch. According to one aspect of the invention, when ATM circuits are no longer needed, the SPVC table entries are not deleted, but the status for the circuit is marked "idle". This conserves bandwidth and allows the circuit to be reused with minimal set-up time in the event that a remote participant leaves a conference and later returns, or in the event that a remote participant will use the circuit to participate in another subsequent conference through the same MMS. When the SPVC table becomes full of idle entries, the oldest entries are purged as needed to make room for new entries.

The RTLM, according to the invention may also be accessed directly by local or remote PCs to establish a connection with the MMS or establish a direct connection with another PC over the ATM or ISDN or other network. According to a presently preferred embodiment, the RTLM is located local to the MMS (on the same workstation used to control the MMS) and receives commands from reservation system via the Audio Video Controller (AVC) of the MMS. Conference participants are also provided with access to the RTLM via TCP/IP connections to the MMS unit. A management user interface for the MMS unit also provides the network manager with access to the RTLM.

The call set-up and caching systems of the invention may be used with any MCU, ATM switch, ISDN server, or other networking equipment by providing the RTLM with the appropriate configuration data. In addition, one or more call set-up and caching systems may be located on one or more remote PCs such that the PC may use the system to set up a connection to an MMS or to set up a direct connection to another PC over a network without accessing the MMS first.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
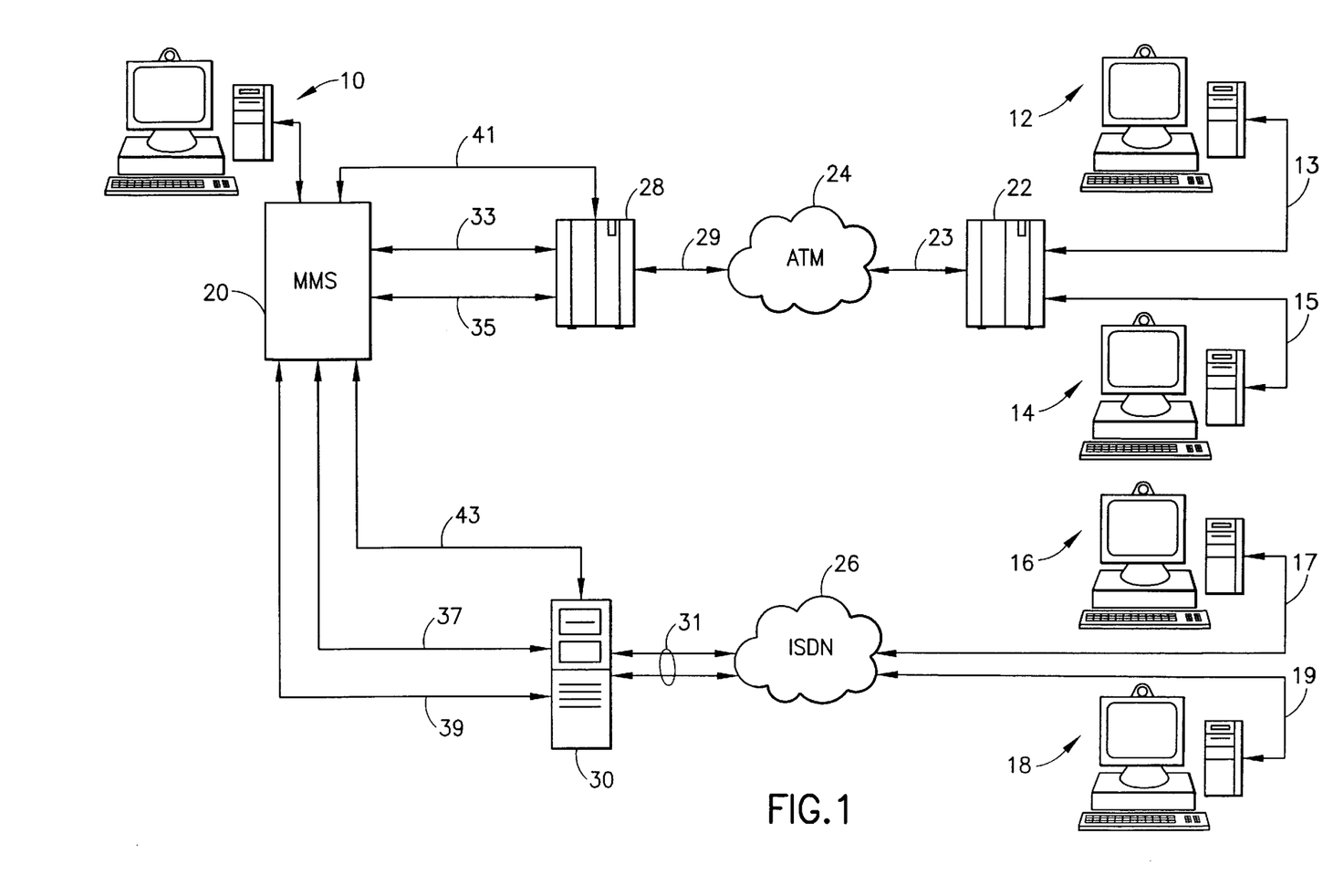
FIG. 1 is a high level schematic block diagram of a multimedia conference incorporating the circuit set-up system of the invention and involving both ISDN and ATM connections.

Referring now to FIG. 1, an exemplary multimedia conference incorporating the circuit set-up system of the invention involves five multimedia PCs 10, 12, 14, 16, 18. The PC 10 is directly connected to a Multimedia Multipoint Server (MMS) 20 which will serve and manage the conference. The PCs 12 and 14 are connected via audio/video (AV) links 13 and 15 respectively to an ATM switch 22 which is connected via link(s) 23 to the ATM network 24. The PCs 16 and 18 are connected via AV links 17 and 19 respectively to the ISDN network 26 (using internal codec cards). In order to provide access to the remote PCs 12 and 14, the MMS 20 is coupled to an ATM switch 28 which is coupled via link(s) 29 to the ATM network 24, and in order to provide access to remote PCs 16 and 18, the MMS 20 is coupled to an ISDN server 30 which is coupled via links 31 to the ISDN network 26. More particularly, the MMS 20 is coupled to the ATM switch 28 via a plurality of audio and video baseband links 33, 35, etc. Those skilled in the art will appreciate that, using a General DataComm MMS 20 and a General DataComm APEX ATM switch 28, the links 33, 35, etc. are effected via baseband analog audio and video interfaces in the MMS 20 which are coupled to Line Interface Modules (LIMs) in "slots" of the ATM switch 28. Each LIM may be related to a different type of service such as Motion JPEG, H.320, or MPEG.2. In addition, those skilled in the art will appreciate that the MMS 20 is coupled to the ISDN server 30 via a plurality of links 37, 39, etc. through baseband analog audio and video interfaces in the MMS 20 which are coupled to codecs in the server 30. A group of related baseband analog audio and video interfaces on the MMS coupling one user to the MMS is referred to as an MMS port. It will also be understood that a multimedia conference may include one or more "sites" which are not PCs. For example, some sites may be VCRs, audio/video cameras, etc.

Although not shown in FIG. 1, the PCs 10, 12, 14, 16, and 18 will also typically have a data connection (T.120) to the MMS. T.120 data is transported over TCP/IP between the PCs and the MMS, either directly through an ETHERNET™ connection or via one of the communications networks (e.g., ATM, ISDN, POTS, etc.).

According to the invention, the call set-up system of the MMS 20, which is described in more detail below with reference to FIG. 2, communicates with the ATM switch 28 and the ISDN server 30, via out-of-band links 41 and 43, respectively. According to the presently preferred embodiment, the links 41 and 43 are ETHERNET™ links. However, any TCP/IP compatible link could be used including SLIP (serial link protocol) or PPP (point to point protocol) via a modem connection. For purposes of illustration, it will be assumed that the ATM switches 22 and 28 are General DataComm Apex™ switches and the ISDN server 30 is an Omega™ Gateway Server from Video Conferencing Systems, Inc. In addition, in order to illustrate the invention, it will be further assumed that the PC 12 is connected to the ATM switch 22 via a Motion JPEG LIM and the PC 14 is connected to the ATM switch 22 via an H.320 LIM. It will also be assumed that the codecs used to couple PC 16 and PC 18 to the ISDN network 26 support H.320.

Figure 2:
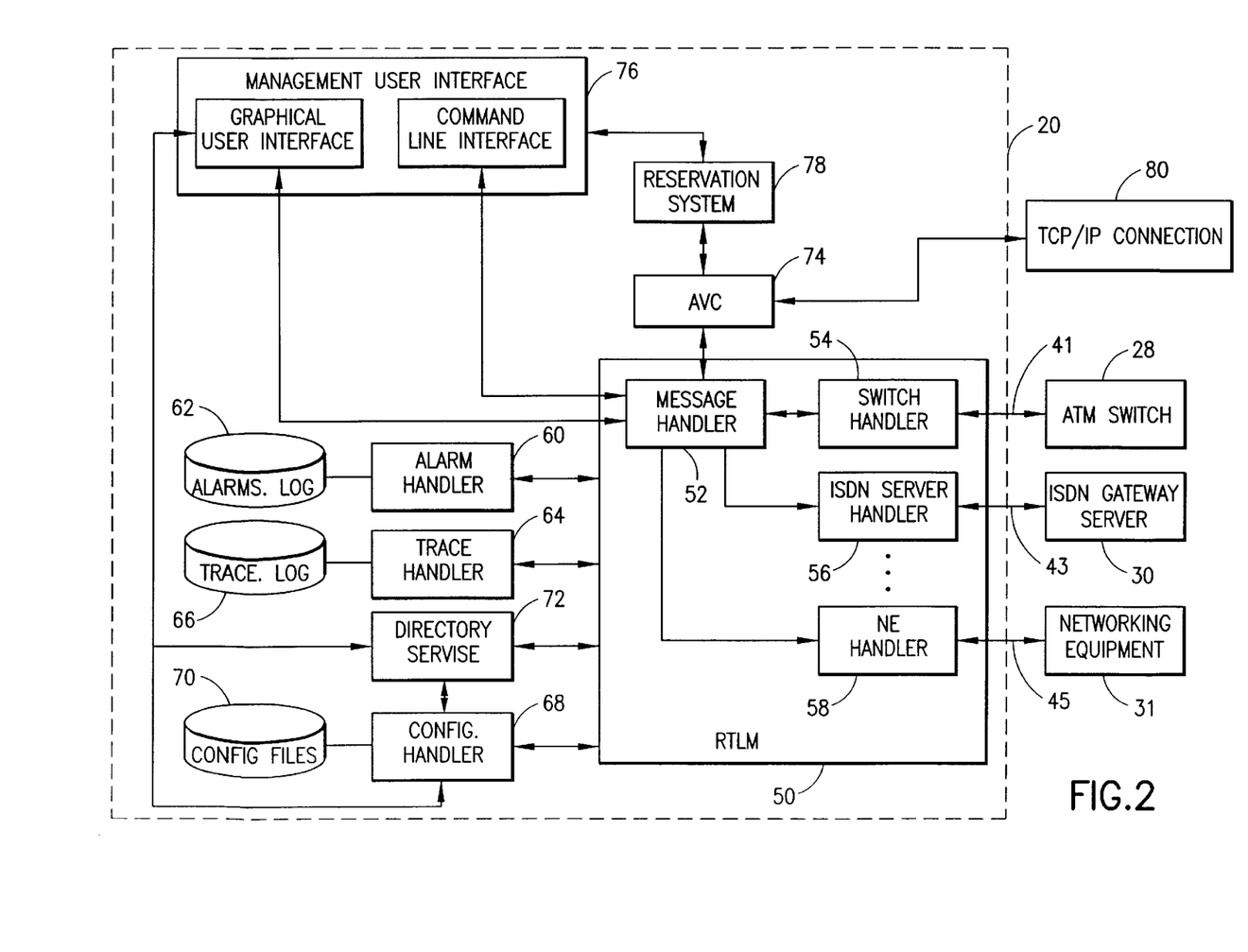
FIG. 2 is a high level schematic block diagram of the major components of the circuit set-up system of the invention.

Turning now to FIG. 2, the call set-up system 50 of the invention is preferably deployed as a software application associated with the MMS 20 and may be referred to as a real time link manager (RTLM). The RTLM 50 generally includes a message handler 52 for receiving commands to set-up or tear down connections, and a plurality of network equipment handlers, e.g. ATM switch handler 54, ISDN server handler 56, and other network equipment handler 58. According to the presently preferred embodiment, a separate ATM switch handler 54 is provided for each slot controller in an ATM switch 28, a single ISDN server handler 56 is provided for each ISDN server 30, and one or more network equipment handlers 58 are provided for each other type of networking equipment 31. The RTLM 50 is preferably provided with access to an alarm handler 60 having an associated alarms.log file 62, a trace handler 64 with an associated trace.log file 66, a configuration handler 68 with associated configuration files 70, and a directory service database 72. The message handler 52 of the RTLM 50 exchanges messages with the audio-video controller (AVC) 74 and the management user interfaces 76 of the MMS unit 20. The AVC 74 exchanges messages with the reservation system 78 (for example a reservation system such as described in previously incorporated Ser. No. 08/586,259) of the MMS 20. The AVC 74 controls the LIMs of the MMS in response to commands from the reservation system 78 and from remote users via a TCP/IP connection 80. The linking of the AVC 74 to the message handler 52 of the RTLM 50 allows the RTLM 50 to set up network connections from the MMS to remote conference sites at the time a conference begins (in the case of automatically joined sites) or when a conference participant joins a conference. The information necessary to set up network connections is obtained by the RTLM from the directory service 72 as well as from the configuration handler 68 and its associated files 70. The management user interfaces 76 are accessible to authorized management stations and are used to modify the directory service database 72 and the configuration files 70.

According to the invention, the RTLM 50 communicates with the directory service database 72 in order to obtain site specific information and communicates with various configuration files 70 via the configuration handler 68 in order to access all of the information needed to set up circuits. The alarms handler 60 and the trace handler 64, together with their associated log files 62, 66, are available to the RTLM 50 for error detection and debugging as may be requested by the management user interfaces 76. The directory service database 72 and the configuration files 70 may be considered a part of the call set-up system 50. More accurately, however, only certain information contained in the configuration files and directory service database should be considered to be part of the call set-up system.

As mentioned above, the RTLM 50 communicates with the ATM switch 28 and the ISDN server 30 via ETHER-NET™ links 41 and 43. In addition, the RTLM can be configured to communicate with any network equipment 31 via a similar out-of-band link 45. According to the presently preferred embodiment, the RTLM 50 communicates with individual slot controllers on the ATM switch 28 using the SNMP protocol. Most ATM switches support SNMP. In the present example, the SNMP PDUs (protocol data units) are used to change entries in SPVC tables of the GDC APEX™ switch. When connected to another type of ATM switch, the RTLM will send SNMP PDUs which include commands appropriate for the particular switch. Since some ISDN servers do not support SNMP, the RTLM 50 communicates with the server 30 via some other out-of-band protocol. In the present example, TCP/IP is used to send commands to the Omega™ Gateway Server, commands which are particular to this brand of server.

From the foregoing, those skilled in the art will appreciate that much of the information needed by the RTLM to set-up circuits will be contained in the various configuration files 70 and the directory service database 72. According to a presently preferred and exemplary embodiment of the invention, the configuration files include the following data sets: rtlm.cfg, system.cfg, switch.cfg, ogs.cfg, hostname.cfg, limtype.cfg, qos.cfg, and sites.cfg.

"rtlm.cfg" includes configuration information regarding the RTLM process such as the polling interval for the status of circuits, whether ATM circuits should be cached, the cache size (maximum number of cached entries), number of retries to establish a circuit, communication timeout values, etc.

"system.cfg" includes the hostname of the domain server (the RTLM obtains the MMS port and site information from the domain server).

"switch.cfg" contains information for each switch that is connected to the MMS, including the descriptive name of the switch, the switch ATM address, and the switch TCP/IP address. This file also contains information for each accessible switch slot, specifying its TCP/IP address.

"ogs.cfg" contains information for each Omega™ Gateway Server that is connected to the MMS, including the descriptive name of the server, the TCP/IP address, list of codec numbers on the server, and the port number of the control port.

"hostname.cfg" contains information for each MMS port, including the type of circuit (ATM or ISDN) supported by the port. For ATM circuits, it includes the switch name and slot name of the LIM link connected to the MMS, the LIM link number, the LIM identifier, and the LIM type. For ISDN circuits, it includes the server name, the codec number of the LIM link connected to the MMS, the LIM identifier, and the LIM type (if appropriate). It also contains information for MMS ports which may be used to interconnect two MMS units in the context of a cascaded conference where sites connected to two different MMS units participate in the same conference.

"limtype.cfg" contains information for each configured LIM type, including the QOS (quality of service) name of its LIM links. For example, for a Motion JPEG LIM, the LIM type will specify separate QOS for each of audio and video LIM links.

"qos.cfg" contains information for each of the defined LIM link type quality of service (QOS) entries, e.g. the default bandwidth for the LIM link expressed in cell rates, the service class, the type of cell policing applied, etc.

"sites.cfg" contains information for each site which can be coupled to the MMS. For sites which are coupled to the MMS via the ATM network, the information for each such site includes ATM address, switches through which the site is accessible from the MMS (where more than one switch on separate ATM segments are used), LIM type and LIM identifier of the remote site, target VPI and target VCI. For sites which are coupled to the MMS via the ISDN server, the information for each such site includes session ID, number of channels used for the call, primary rate interface (PRI) type, IP address, phone numbers, and audio offset.

As mentioned above, the alarms handler 60 and the trace handler 64 are available to the RTLM software as well as to all other MMS software modules. When enabled, alarms regarding error conditions will be logged in the "alarms.log" and message events between the RTLM and other entities will be recorded in the "trace.log".

Figures 3, 3A:
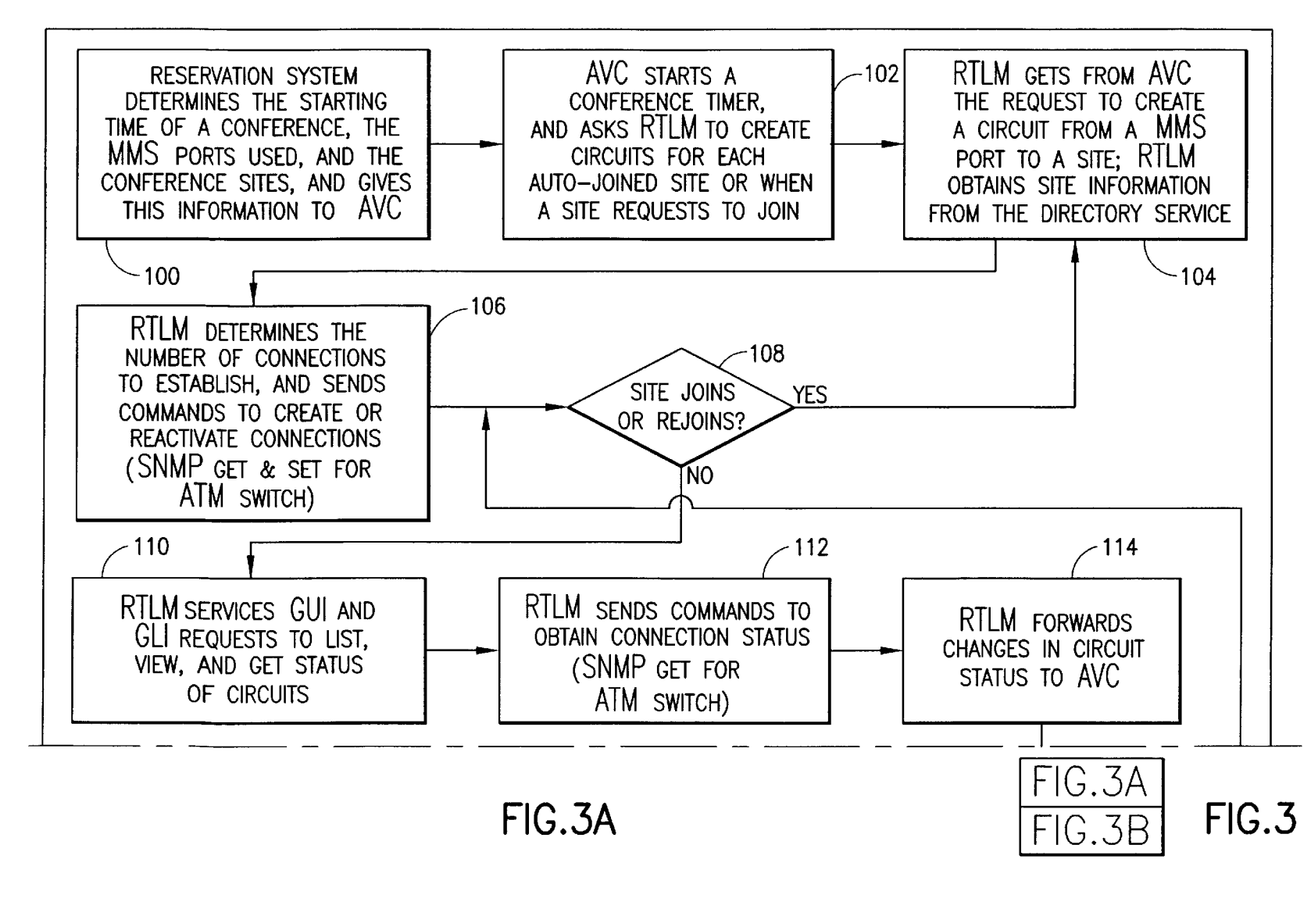
FIG. 3 is a high level flow chart illustrating the basic sequence of operations of the circuit set-up system of the invention.
Figure 3B:
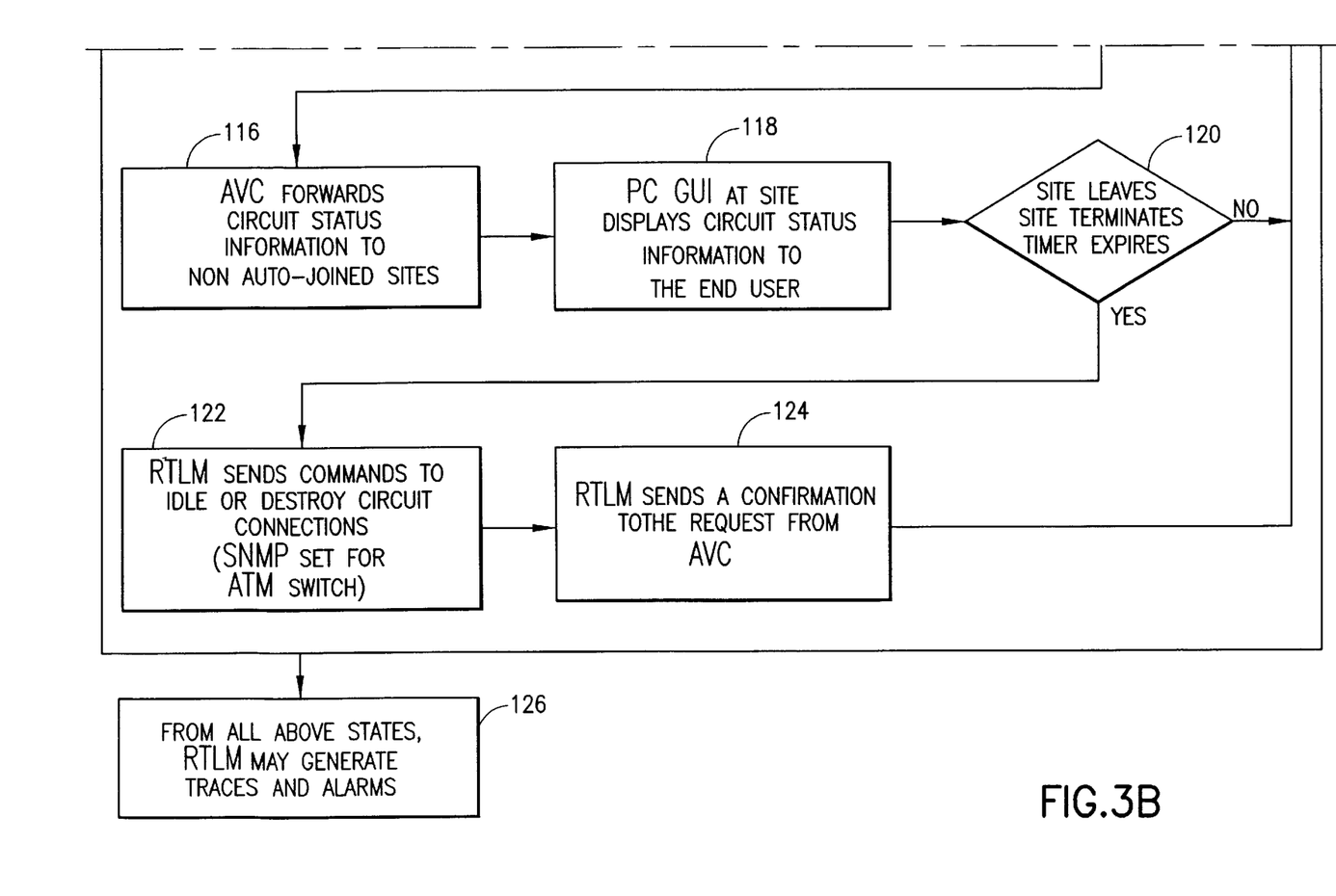

Turning now to FIG. 3, the general operation of the circuit set-up system is triggered by the reservation system at the time a conference is to begin. In particular, the reservation system determines at 100 that it is time for a reserved conference to begin and sends information to the AVC to start the conference. The information provided to the AVC includes the identity of the MMS ports to be used for the conference and the names of the sites which are participating in the reserved conference. The AVC, at 102, starts a conference timer and sends instructions to the RTLM to set-up circuits for conference sites which are to be automatically joined to the conference, e.g. VCRs, sites having A/V equipment but no PC, etc. The RTLM, at 104, receives the instructions from the AVC and obtains site information from the directory service database. At 106, the RTLM determines from the various config files which circuits need to be set-up and sends commands to the ATM switch(es) and the ISDN server(s) to set-up the circuits. In particular, the RTLM sends SNMP "Get" and "Set" commands to the switch(es) and the proprietary ISDN server commands to the ISDN servers as will be described in more detail below with reference to the Examples. At 108, the RTLM looks to the AVC to determine whether the AVC has received any requests from conference participants to join the conference. As mentioned above, the sites which are not automatically joined to the conference join by sending a request to the AVC via the TCP/IP connection. The sites access the AVC via the TCP/IP connection in any normal manner, e.g. via a direct network connection or via the internet, etc. If it is determined at 108 that the AVC has received a request to join the conference, the RTLM repeats the steps at 104 and 106 with regard to the port and site name associated with the request to join. If there are no pending requests to join (or rejoin) the conference, the RTLM performs various "housekeeping" tasks at 110–118. In particular, at 110, the RTLM responds to any pending requests from the management user interfaces such as list, view, or get status of circuits. At 112, the RTLM acquires updated connection status information by sending the appropriate commands to the ATM switches and ISDN servers. The RTLM forwards updated circuit status information to the AVC at 114. The AVC makes the updated circuit status information available at 116 to the conference sites which were not automatically joined to the conference. This information may be accessed as shown at 118 by PC sites. At 120, the RTLM looks to the AVC to determine whether a site has left the conference (sites leave the conference by sending a command to the AVC via the TCP/IP connection) or whether the conference timer has expired. If no site has left the conference and the reserved conference time has not expired, the RTLM returns to 108 to determine whether any sites have pending requests with the AVC to join the conference. If it is determined at 120 that one or more sites have left the conference, the RTLM sends commands at 122 to destroy the affected ISDN connections or to idle the affected ATM connections. The status of these connections is then optionally sent to the AVC at 124 and the RTLM returns to 108 to determine whether any sites have requested to join or rejoin the conference. As shown in FIG. 3 at 126, traces and alarms may be generated at all of the RTLM states.

Throughout the conference, the users have access to the AVC via the TCP/IP connection and may leave and rejoin the conference. Should a circuit go down for any reason, the status of the circuit is made available by the RTLM to the AVC as well as to the management user interface, and the affected conference participant will be informed when the circuit comes back up so that the participant can re-join the conference.

The description given above is greatly simplified and applies to the general operation of the circuit set-up and caching system. Those skilled in the art will appreciate that the system also operates in other states. In general, these states may be referred to as: "initialization", "configuration", "run", "terminate", and "circuit process". It will also be understood that certain functions of the system must be performed in the correct order. For example, handlers must be initialized before the RTLM can be configured, etc. It will also be understood that the creation of SPVCs typically involves the creation of several SVCs across several ATM switches. Further, the RTLM process is preferably multithreaded, utilizing a separate thread for each ATM switch slot, for each ISDN server, and for each other type of network equipment connected to the MMS.

Those skilled in the art will also understand that the system of the invention should be provided with a restart recovery function. According to a presently preferred embodiment, if a slot controller or ISDN server goes down, or if there is a loss of connection, one status indication and one alarm are generated. The status indication indicates that the circuit state is currently unknown. It is the responsibility of AVC, the user of the RTLM service, to decide what action should be taken upon that error. In the case of connection loss, the last operation on an SPVC (destroy, enable, disable) or ISDN connection (destroy) is cached and replayed by the RTLM when the connection is re-established. When the connection is re-established, a status indication reporting the current state of the circuit is sent to the circuit creator, e.g. the AVC. When a switch goes down, SPVCs are destroyed since they have not been statically created and saved with the configuration of the switch. ISDN server connections might also be closed by the ISDN server. When the switch comes back up, the RTLM will detect that SPVCs have been destroyed and will send a circuit destroy indication to the creator of the circuit for each circuit that has been destroyed. Similarly, a circuit destroy indication will be sent to the creator of a circuit on the ISDN server. In addition to restart recovery, the system also preferably includes standard error reporting and debugging features such as detecting errors in config files at the time of initialization, etc.

As mentioned above, an important feature of the invention is the manner in which the RTLM communicates with the ATM switches and the ISDN servers. In order to better understand the invention, several examples of RTLM dialog with ATM switches and ISDN servers are provided. The dialog is accomplished via an out-of-band connection and thereby avoids the complexities of ATM/ISDN signalling.

EXAMPLE 1

In order to create a new SPVC on an ATM switch, the RTLM sends the command: SNMP-GET-NEXT-REQ (sPvcId.spvc_id), where spvc_id is the ID of the last SPVC created by the RTLM. The APEX™ switch will respond: SNMP-GET-RSP(sPvcId.spvc_id, next_spvc_id), where next_spvc_id is the ID of the next free SPVC that will be allocated for a circuit.

Once the ID of the new SPVC is thus established, the RTLM will set up the appropriate circuit depending on the multimedia requirements of the remote site. For example, if the RTLM determines from the sites.cfg file that this circuit will be used to connect a site which utilizes the H.320 or MPEG2 multimedia standard, a single circuit will be created for mixed audio and video. The command used to create the circuit is listed below where spvc__id is the ID of the SPVC that is being created and the values are taken by the RTLM from the configuration files and the directory service database. Following the command, the slot controller of the switch will respond with SNMP-GET-RSP as confirmation.

SNMP-SET-REQ
(sPvcId.spvc__id, spvc__id)
(sPvcForwardPeakCellRate.spvc__id, value)
(sPvcForwardPeakMode.spvc__id, value)
(sPvcBackwardPeakCellRate.spvc__id, value)
(sPvcBackwardPeakMode.spvc__id, value)
(sPvcForwardSustainableCellRate.spvc__id, value)
(sPvcForwardMaxBurstSize.spvc__id, value)
(sPvcForwardSustainableMode.spvc__id, value)
(sPvcBackwardSustainableCellRate.spvc__id, value)
(sPvcBackwardMaxBurstSize.spvc__id, value)
(sPvcBackwardSustainableMode.spvc__id, value)
(sPvcQosClass.spvc__id, value)
(sPvcRetry.spvc__id, value)
(sPvcNumberRetries.spvc__id, value)
(sPvcAlertFailures.spvc__id, value)
(sPvcSourceVci.spvc__id, value)
(sPvcSourceVpi.spvc__id, value)
(sPvcTargetVci.spvc__id, value)
(sPvcTargetVpi.spvc__id, value)
(sPvcAddress.spvc__id, value)

It will be appreciated that if the sites.cfg file indicates that the circuit will be used to connect a site which utilizes the MOTION JPEG multimedia standard, separate circuits will be created for audio and video. The information regarding the type and number of circuits required for each conference site is kept transparent to the users and the AVC.

Once the SPVC has been created, it is enabled by the RTLM with the command: SNMP-SET-REQ (sPvcCallState.spvc__id, active(2)). Following the command, the slot controller of the switch will respond with SNMP-GET-RSP as confirmation.

The creation of a circuit takes approximately five seconds to complete. Therefore, according to the invention, circuits (circuit creation information) are cached rather than destroyed in order to save time in the event that the same circuit will be used again.

Cached circuits may be idled by the RTLM with the command: SNMP-SET-REQ(sPvcCallState.spvc__id, idle (3)). Following the command, the slot controller of the switch will respond with SNMP-GET-RSP as confirmation. An idle cached circuit is reactivated by the RTLM with the command: SNMP-SET-REQ(sPvcCallState.spvc__id, active (2)).

The status of the SPVC is checked by the RTLM with the command: SNMP-GET-REQ(sPvcStatus.spvc__id). Following the command, the slot controller of the Switch will respond with SNMP-GET-RSP(sPvcStatus,value).

If caching is not enabled or if a cached circuit needs to be destroyed (to make room in the SPVC table for new circuits) the circuit is destroyed by the RTLM with the command: SNMP-SET-REQ(sPvcCallState.spvc__id,invalid(4)). This command will delete the entry from the SPVC table.

Figure 4:
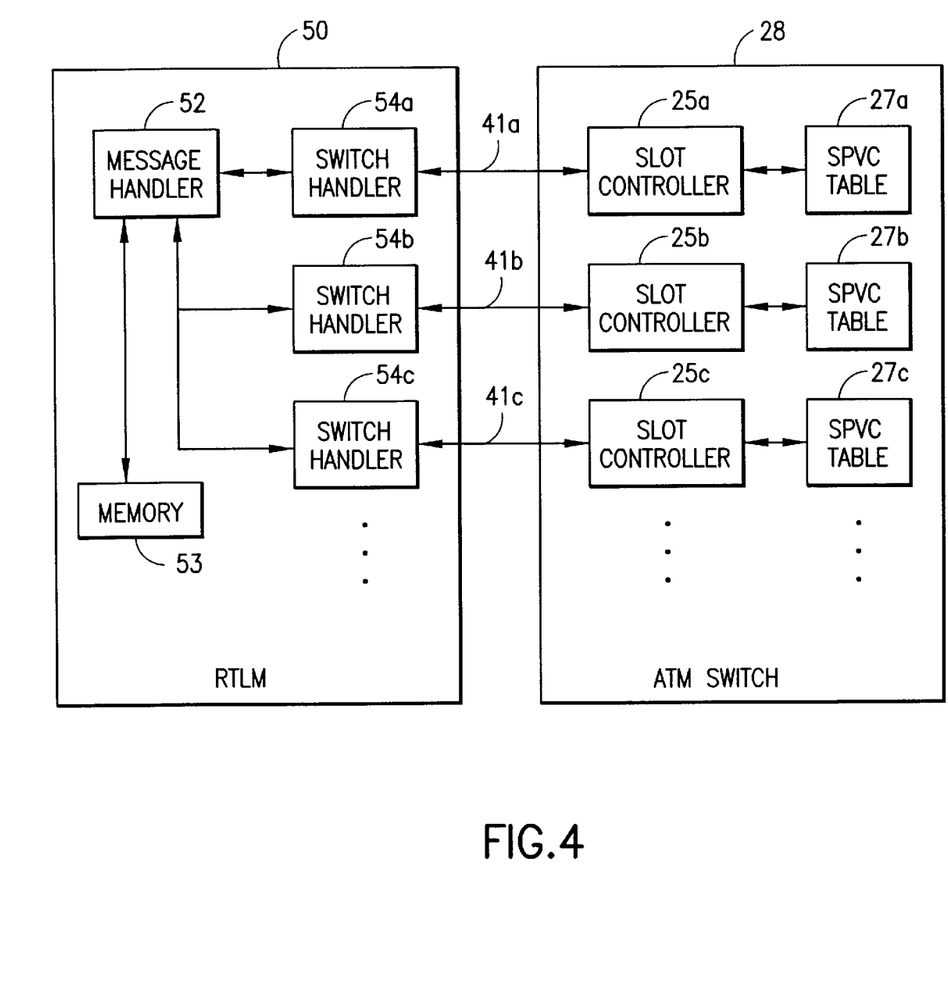
FIG. 4 is a high level schematic block diagram illustrating the circuit caching apparatus of the invention.

Turning now to FIG. 4, and as mentioned above, the RTLM 50 is provided with a separate switch handler 54a, 54b, 54c, etc. for each slot controller 25a, 25b, 25c, etc. of the ATM switch 28. Each slot controller 25a, 25b, 25c, etc. in the ATM switch 28 has its own SPVC table 27a, 27b, 27c, etc. According to a presently preferred embodiment of the circuit caching system of the invention, at the time the system is initialized, the RTLM 50 reads all of the SPVC tables 27a, 27b, 27c, etc. on the ATM switch(es) 28 connected to the MMS. All SPVC entries which refer to one of the MMS LIMs as a source are deleted. The RTLM 50 will then maintain a list of all the SPVC entries created by it for caching purposes. The RTLM 50 is, therefore, provided with a memory 53 for storing the list of all SPVC entries which it creates.

Referring now to FIG. 4 and Example 1, above, each time the RTLM 50 successfully creates a new circuit on the ATM switch 28, a new circuit entry is created and added to a circuit list stored in the memory 53. The circuit entry preferably includes a circuit ID, a reference to the circuit creator (e.g., the AVC), and all parameters provided to the circuit-create request (e.g., the MMS port number and the remote site name). Once the SPVCs are created on the switch for this circuit, SPVC entries are created and stored together with the circuit entry. Each SPVC entry includes the SPVC ID and all parameters used to create the SPVC on the switch. When the circuit is no longer needed, e.g. when a site leaves the conference or when the conference ends, the RTLM sends an SNMP Set request to the appropriate slot controller to alter the SPVC table entry for the circuit which is no longer needed. In particular, the SNMP Set request is given to change the SPVC call state attribute to "idle". Each time the RTLM 50 receives a circuit-create request, the circuit list in the memory 53 is scanned to determine whether the circuit has been previously created and is now idle. If the circuit-create request is for a circuit which has been previously created and is now idle, the RTLM sends an SNMP Set request to the appropriate slot controller to alter the SPVC table entry for the circuit to change the SPVC call state attribute to "active".

According to a preferred embodiment of the invention, the SPVC table(s) on the ATM switch is fairly large and can store, e.g., five hundred entries, where each entry includes the SPVC identifier as well as all of the information needed to create the SPVC. As mentioned above, the maximum number of SPVCs required to connect any single site to a conference is two (if the site uses the Motion JPEG standard). Therefore, the minimum number of site connections which can be cached is two hundred fifty. The General DataComm MMS is capable of connecting up to thirty-two sites in a single conference. Thus, the SPVC circuit cache will not need to be flushed if the number of sites known to the MMS is less than or equal to two hundred fifty. This substantial cache enables conference sites to be joined to a conference very quickly, even when a large number of sites attempt to join the conference simultaneously.

The circuit cache according to the invention is managed according to a first in first out FIFO policy so that the oldest idle cache entries are flushed first. Given the size of the SPVC table, FIFO is an efficient policy for managing the cache. However, other policies could be used. For example, a least-recently-used policy could be implemented where the age of an idle cached circuit is indicative of the last time the circuit was active. It will be appreciated that when an SPVC entry is purged from the table, the corresponding circuit entry in the circuit list, with its SPVC entries, is also purged.

EXAMPLE 2

In order to create an ISDN connection, the RTLM will send proprietary commands to the ISDN server, in the case of an Omega™ server, the dialog begins with the RTLM identifying the MMS for the server using the command IAM(mms_name). Next the RTLM asks for confirmation from the server by issuing the AYT command, to which the server responds YIA. The ISDN connection is then initiated with the commands:

LSN(session_id)
SCN(,session_id,num_channels,pri_type,ip,num1,num2, num3,num4, num5,num6,audio_offset).

ISDN connection status is checked initially with the command ?codec_number.dial_state to which the server responds ?codec_number.dial_state=value. After the connection has been established, the status of the codec is checked with the command ?codec_number.codec_state to which the server responds ?codec_number.codec_state= value.

The ISDN connection is terminated with the command: HUC(codec_number).

In general, any network device which is capable of out-of-band communication with the RTLM can be accommodated by the circuit set-up system of the invention. According to the presently preferred embodiment of the invention, the RTLM should provide at least six services to the AVC (and thus to sites which communicate with the AVC). These services include: circuit create, circuit destroy, circuit list, circuit modify, circuit status, and circuit view.

As alluded to hereinabove, the circuit set-up and caching system of the invention can be used in a configuration involving more than one MMS. This is accomplished by designating one of the MMS units as a Master and the other as a Slave. At conference start, the AVC at the Master site will instruct the RTLM at the master site to connect to the "cascaded site" (the Slave MMS). The RTLM will consult the Directory Service which will provide all of the information needed to establish a circuit connection to the Slave MMS.

There have been described and illustrated herein a circuit set-up and caching system for multimedia multipoint servers. It will be understood that the term "circuit" as used above and in the claims means any connection which needs to be "set up", including virtual circuits, switched circuits, packet circuits, public and private network circuits, etc. While particular embodiments of the invention have been described, it is not intended that the invention be limited thereto, as it is intended that the invention be as broad in scope as the art will allow and that the specification be read likewise. Thus, while particular commands have been disclosed for controlling ATM switches and ISDN servers, it will be appreciated that other commands could and would be utilized with network devices other than those disclosed. Also, while particular multimedia standards have been shown by way of example, it will be recognized that other multimedia standards or proprietary schemes could be accommodated by the invention with similar results obtained. Moreover, while particular configurations have been disclosed in reference to user interfaces and reservation systems, it will be appreciated that other configurations could be used as well. Furthermore, while the invention has been disclosed as having particular software components, it will be understood that different software, hardware, or firmware components can achieve the same or similar function as disclosed herein. It will therefore be appreciated by those skilled in the art that yet other modifications could be made to the provided invention without deviating from its spirit and scope as so claimed.

We claim:

1. A system for automatically setting-up circuit connections between multimedia devices and a multimedia multipoint server connected to a telecommunications network via a first network device such as an ATM switch or an ISDN server, the multimedia multipoint server optionally including a reservation system, said system comprising:
   a) a call set-up module responsive to at least one of the reservation system and one of the multimedia devices;
   b) first control link means for coupling said call set-up module to the first network device; and
   c) database means for storing information about the location and characteristics of the multimedia devices, said database means accessible to said call set-up module, wherein
      said call set-up module responds to at least one of the reservation system and one of the multimedia devices by accessing said database means and sending commands via said first control link means to the first network device to set up circuit connections to the multimedia devices, and
      said first control link is an out-of-band link.

2. A system according to claim 1, wherein:
   said out-of-band link is one of an ETHERNET™ connection, a PPP connection, an SLIP connection, and a TCP/IP supporting connection.

3. A system according to claim 1, wherein:
   said call set-up module is responsive to one of said multimedia devices via an out-of-band link.

4. A system according to claim 3, wherein:
   said out-of-band link is one of an ETHERNET™ connection, a PPP connection, an SLIP connection, and a TCP/IP supporting connection.

5. A system according to claim 1 for automatically setting-up circuit connections between multimedia devices and a multimedia multipoint server connected to a telecommunications network via a first network device, namely an ATM switch, and a second network device, namely an ISDN server, said system further comprising:
   d) second control link means for coupling said call set-up module to the second network device, wherein
      said call set-up module responds to one of the reservation system and one of the multimedia devices by accessing said database means, sending commands via said first control link means to the first network device to set-up circuit connections to some of the multimedia devices, and sending commands via said second control link means to the second network device to set-up circuit connections to some other of the multimedia devices.

6. A system according to claim 5, wherein:
   said call set-up module sends commands to the ATM switch using SNMP.

7. A system according to claim 5, wherein:
   said call set-up module sends commands to the ISDN server using TCP/IP.

8. A system according to claim 1, where the first network device is an ATM switch, said system further comprising:
   d) circuit caching means for placing a virtual circuit in an idle state when not needed and rapidly returning it to an active state when needed.

9. A system according to claim 1, wherein:
   the multimedia multipoint server includes an audio video controller responsive to at least one of a reservation system and one of the multimedia devices, and
   said call set-up module is responsive to the audio video controller for controlling the first network device.

10. A system according to claim 9, wherein:
    said call set-up module periodically polls circuit connections to determine their status and reports the status to the audio video controller.

11. A system according to claim 10, further comprising:

d) user interface means for providing at least one of the multimedia devices with access to one of the audio video controller and said call set-up module.

12. In a multimedia multipoint server which is coupled to an ATM network via an ATM switch, the improvement comprising:

circuit set-up means for establishing a virtual circuit through the ATM switch, said circuit set-up means including means for writing an entry in an SPVC table in the ATM switch; and circuit caching means for placing the virtual circuit in an idle state when not needed and rapidly returning it to an active state when needed, said circuit caching means including means for altering said entry in the SPVC table in the ATM switch.

13. A multimedia multipoint server according to claim 12, wherein:

said circuit caching means further includes memory means for storing information corresponding to the virtual circuit created by said circuit set-up means.

14. A multimedia multipoint server according to claim 13, wherein:

said means for writing includes means for sending SNMP requests to the ATM switch.

15. A multimedia multipoint server according to claim 14, wherein:

said means for altering includes means for sending SNMP requests to the ATM switch.

16. A multimedia multipoint server according to claim 15, wherein:

said circuit caching means includes means for reading all virtual circuit SPVC table entries in the ATM switch.

17. A multimedia multipoint server according to claim 16, wherein:

said circuit caching means includes means for deleting virtual circuit SPVC table entries in the ATM switch.

18. A circuit set-up system for use with an ATM switch coupled to an ATM network to set up virtual circuit connections between sites via the ATM network, said system comprising:

a) a call set-up module responsive to at least one of the sites;

b) first control link means for coupling said call set-up module to the ATM switch; and c) database means for storing information about the location and characteristics of the sites, said database means accessible to said call set-up module, wherein said call set-up module responds to at least one of the sites by accessing said database means and sending commands via said first control link means to the ATM switch to set up a virtual circuit connection to another of the sites.

19. A system according to claim 18, further comprising:

d) circuit caching means for placing a virtual circuit in an idle state when not needed and for rapidly returning it to an active state when needed.

* * * * *